United States Patent
Eibeck et al.

(10) Patent No.: US 9,505,912 B2
(45) Date of Patent: Nov. 29, 2016

(54) POLYAMIDE MOLDING MATERIALS WITH IMPROVED THERMAL AGING AND HYDROLYSIS STABILITY

(75) Inventors: Peter Eibeck, Ludwigshafen (DE); Jochen Engelmann, Singapore (DE); Ralf Neuhaus, Heidelberg (DE); Anka Bernnat, Schifferstadt (DE)

(73) Assignee: BASF SE (DE)

( * ) Notice: Subject to any disclaimer, the term of this patent is extended or adjusted under 35 U.S.C. 154(b) by 726 days.

(21) Appl. No.: 12/377,450

(22) PCT Filed: Aug. 7, 2007

(86) PCT No.: PCT/EP2007/058165
§ 371 (c)(1),
(2), (4) Date: Feb. 13, 2009

(87) PCT Pub. No.: WO2008/022910
PCT Pub. Date: Feb. 28, 2008

(65) Prior Publication Data
US 2011/0224346 A1    Sep. 15, 2011

(30) Foreign Application Priority Data

Aug. 23, 2006 (EP) .................... 06119377

(51) Int. Cl.
C08L 77/06 (2006.01)
C08L 101/16 (2006.01)
C08K 7/14 (2006.01)
C08K 13/04 (2006.01)

(52) U.S. Cl.
CPC ........ *C08K 7/14* (2013.01); *C08K 13/04* (2013.01)

(58) Field of Classification Search
CPC . C08L 77/06; C08L 2666/80; C08L 2666/72
USPC ........................................ 524/492, 493, 494
See application file for complete search history.

(56) References Cited

U.S. PATENT DOCUMENTS

| | | | |
|---|---|---|---|
| 4,414,358 A | 11/1983 | Nield et al. | |
| 4,866,115 A | 9/1989 | Betz et al. | |
| 4,937,276 A | 6/1990 | Nielinger et al. | |
| 5,112,908 A | 5/1992 | Epstein | |
| 5,114,765 A * | 5/1992 | Inada et al. .................. | 428/35.7 |
| 5,389,410 A | 2/1995 | Mugge et al. | |
| 5,443,098 A | 8/1995 | Kertesz | |
| 5,554,426 A | 9/1996 | Rober et al. | |
| 5,708,245 A | 1/1998 | Werner et al. | |
| 5,962,628 A | 10/1999 | Keske | |
| 6,013,709 A * | 1/2000 | Masuyama et al. .......... | 524/224 |
| 6,181,230 B1 | 1/2001 | Broome et al. | |
| 6,284,830 B1 * | 9/2001 | Gottschalk et al. .......... | 524/449 |
| 6,518,341 B1 | 2/2003 | Hurley et al. | |
| 7,089,952 B2 | 8/2006 | Nakamura et al. | |
| 7,858,172 B2 | 12/2010 | Imaizumi et al. | |
| 2003/0055210 A1 | 3/2003 | Sawada et al. | |
| 2005/0250886 A1 | 11/2005 | Stoeppelmann et al. | |
| 2008/0232133 A1 * | 9/2008 | Segawa ...................... | 362/610 |
| 2009/0098325 A1 | 4/2009 | Uchida et al. | |
| 2009/0105392 A1 | 4/2009 | Yamauchi et al. | |

FOREIGN PATENT DOCUMENTS

| | | |
|---|---|---|
| DE | 1420696 A1 | 10/1968 |
| DE | 4239909 C1 | 5/1994 |
| DE | 19535413 C1 | 10/1996 |
| DE | 19533920 A1 | 3/1997 |
| DE | 19543318 A1 | 5/1997 |
| DE | 19821719 A1 | 11/1999 |
| DE | 102004022963 A1 | 12/2005 |
| EP | 0129974 | 1/1985 |
| EP | 0291833 | 11/1988 |
| EP | 0382277 A1 | 1/1990 |
| EP | 0673762 | 9/1995 |
| EP | 0754898 A1 | 1/1997 |
| EP | 0827976 A2 | 3/1998 |
| EP | 0846138 A1 | 6/1998 |
| EP | 1241229 A1 | 9/2002 |
| EP | 1273628 A1 | 1/2003 |
| EP | 1424361 | 6/2004 |
| EP | 1860134 A1 | 11/2007 |
| EP | 2020282 A1 | 2/2009 |
| EP | 2025717 A1 | 2/2009 |
| GB | 890437 A | 2/1962 |
| JP | 61-188462 A | 8/1986 |
| JP | 62000548 A | 1/1987 |
| JP | 62252424 A | 11/1987 |
| JP | 2235960 A | 9/1990 |
| JP | 4-220458 A | 8/1992 |
| JP | 5-117525 A | 5/1993 |
| JP | 60-32847 A | 2/1994 |
| JP | 6-192568 A | 7/1994 |
| JP | H06306278 A | 11/1994 |
| JP | 2002-047412 A | 2/2002 |
| JP | 2002-173171 A | 6/2002 |
| JP | 2002-294069 A | 10/2002 |
| JP | 2003-277605 A | 10/2003 |
| WO | WO-97/08222 A1 | 3/1997 |
| WO | WO-9708222 | 3/1997 |

(Continued)

OTHER PUBLICATIONS

Bottenbruch et al., Kunstoff-Handbuch, 3. Technische Thermoplaste, 4. Polyamide, pp. 77-84, 1998.

(Continued)

*Primary Examiner* — Ling Choi
*Assistant Examiner* — Thuy-Al Nguyen
(74) *Attorney, Agent, or Firm* — Drinker Biddle & Reath LLP

(57) ABSTRACT

Thermoplastic molding compositions, comprising:
(A) from 20 to 85% by weight of at least one polyamide whose number of amino end groups is ≥50 mmol/kg,
(B) from 14.9 to 60% by weight of glass fibers.
(C) from 0.01 to 2% by weight of at least one heat stabilizer,
(D) from 0 to 1.5% by weight of at least one mold-release agent, and
(E) from 0 to 30% by weight of other additives,
where the total of the percentages by weight of (A)-(E) is 100.

20 Claims, No Drawings

(56) References Cited

FOREIGN PATENT DOCUMENTS

| WO | WO-0078869 A1 | 12/2000 |
|----|---|---|
| WO | WO-02/38662 A1 | 5/2002 |
| WO | WO-0238664 A2 | 5/2002 |
| WO | WO-2004/022652 A1 | 3/2004 |
| WO | WO-2005017042 A1 | 2/2005 |
| WO | WO-2006010543 A1 | 2/2006 |
| WO | WO-2006/084852 A2 | 8/2006 |
| WO | WO-2007/125784 A1 | 11/2007 |

OTHER PUBLICATIONS

R. Gächter et al., "Stabilizers, Processing Aids, Plasticizers, Fillers, Reinforcements, Colorants for Thermoplastics", Plastics Additives Handbook, pp. 12-15 and 82-83, 1996.
Product Information for DuPont Zytel, plastics.dupont.com.
Norman S. Allen et al., "Thermal and Photo-chemical Degradation of Nylon 6,6 Polymer: Part 1—Influence of Amine-Carboxyl End Group Balance on Luminescent Species", Polymer Degradation and Stability, vol. 19, pp. 77-95, 1987.
Michael Nathan Grigg, "Thermo-Oxidavtive Degradation of Polyamide 6", A Thesis Submitted for the Degree of Doctor of Philosophy, 2006.
Melvin I. Kohan, "Nylon Plastics Handbook", pp. 338-340, 1995.
Extracts from Plastics Digest, Principal Properties, 1998.
English Translation of p. 8 of JIS, Jul. 1, 1994.
English Translation of p. 21 of JIS, Jul. 1, 1994.
Declaration of John Buzinkai, Oct. 14, 2011.
Dan Forsström, "Novel Techniques for Characterisation of the Oxidative Stability of Polyamides", Department of Polymer Technology Royal Institute of Technology Stockholm, Sweden, pp. 9-22, 1999.
Analysis of Zytel, 2011.
"Strength and Silence are Golden", Plasticstoday.com, 2 pages, 2011.
"Plastics—Polyamides—Determination of viscosity number". International Standard, pp. 1-19, 2003, ISO307:2003(E).
Y. Zhou et al., "A non-linear dmage model for the tensile behavior of an injection moded short E-glass fiber reinforced polyamide-6,6", Materials Science and Engineering, A 393, pp. 303-309, 2005.
P.K. Mallick et al., "Effect of mean stress on the stress-controlled fatigue of a short E-glass fiber reinforced polyamide-6,6", International Journal of Fatigue, vol. 26, pp. 941-946, 2004.
W. Woebcken, "Kunststoff Taschenbuch", Polyethylen, pp. 244-245, 1992.
J. Falbe et al., "Rompp Chemie Lexikon", Polyethylene, pp. 3530-3531, 1992.
G. W. Ehrenstein, "Polymer-Werkstoffe", Heterogene Verbundwerkstoffe, pp. 134-135, 1999.

\* cited by examiner

POLYAMIDE MOLDING MATERIALS WITH IMPROVED THERMAL AGING AND HYDROLYSIS STABILITY

CROSS REFERENCE TO RELATED APPLICATIONS

This application is a National Stage of PCT/EP2007/057165 filed Aug. 7, 2007 which in turn claims priority from European Application 06119377.7 filed Aug. 23, 2006, the entire contents of which are incorporated herein by reference.

The present invention relates to thermoplastic molding compositions, comprising:
(A) from 20 to 85% by weight of at least one polyamide whose number of amino end groups is ≥50 mmol/kg,
(B) from 14.9 to 60% by weight of glass fibers.
(C) from 0.01 to 2% by weight of at least one heat stabilizer,
(D) from 0 to 1.5% by weight of at least one mold-release agent, and
(E) from 0 to 30% by weight of other additives,
where the total of the percentages by weight of (A)-(E) is 100. The invention furthermore relates to the use for production of moldings of any type, and to moldings obtained from the inventive molding compositions.

Thermoplastic polymers, such as polyamides, are often used in the form of glassfiber-reinforced molding compositions, as engineering material for components whose use subjects them to elevated temperatures and/or brings them into contact with liquids. The result can be thermooxidative damage to, and/or hydrolytic degradation of, the polymer. The two processes can have an adverse effect on the lifetime of these materials. Although thermooxidative damage can be delayed by adding heat stabilizers, this does not provide any long-lasting prevention of adverse alteration of the properties of the polyamides by reaction of heat. An adverse alteration in the properties of the polyamides is evident, for example, in a fall-off of mechanical properties. An improvement in the resistance of polyamides to heat-aging and/or to hydrolysis is highly desirable, since it can achieve longer service times for components which come into contact with liquids and/or have exposure to an elevated temperature.

The prior art describes various procedures for increasing the thermal stability of thermoplastic polymers and/or their resistance to hydrolysis, in particular in polyamides.

Kunststoff Handbuch [Plastics handbook], 3. Technische Thermoplaste [Engineering thermoplastics], 4. Polyamide [Polyamides], pp. 77-84, 1998 Carl Hanser Verlag Munich Vienna discloses the use of various heat stabilizers in polyamides. Stabilizers that can be used are compounds selected from sterically hindered phenols and secondary amines.

WO 97/08222 relates to a process for preparation of polyamides via polymerization of dicarboxylic acids with diamines, with aminocarboxylic acids, or with lactams, where either the acid or the amine is present in excess, so that the ratio of carboxylic acid end groups to amino end groups in the polymer is at least 2.0:1.0. A feature of the polyamides prepared via the process according to WO 97/08222 is improved melt viscosity, and flowability.

EP 0 129 974 A2 discloses components which have resistance to warm antifreeze compositions and which comprise from 0.1 to 10% by weight of a copolymer composed of monomers which have ethylenic unsaturation, alongside polyamides selected from nylon-6,6, nylon-6, and nylon-6,10. These copolymers have functional groups on the main polymer chain, and said groups can enter into reactions with the end groups of the polyamide. The functional groups are preferably carboxylic acid groups or carboxylic anhydride groups. Acrylic acid or maleic anhydride is used, for example.

EP 1 424 361 A1 discloses molding compositions comprising a thermoplastic polycondensate, reinforcing materials, crosslinkable additives, and further polymeric components. This molding composition is irradiated with beta, gamma, X-ray, or UV radiation or electron beams after thermoplastic shaping and is at least partially crosslinked thereby. The at least partial crosslinking gives the thermoplastic molding compositions according to EP 1 424 361 A1 increased resistance to hydrolytic degradation.

JP 3200868 discloses polymer blends composed of polyamides with non-polar, hydrophobic blend components, selected by way of example from copolymers composed of styrene and maleic anhydride, and also of modified polypropylene. The presence of these non-polar, hydrophobic blend partners markedly increases resistance to hydrolysis.

The prior art discloses that the thermal stability of polyamides can be favorably affected via addition of heat stabilizers and that the melt viscosity and flowability of polyamides can be favorably affected via a certain end group ratio. Furthermore, the prior art discloses that the resistance of polyamides to hydrolysis can be increased by admixing, with the polyamides, non-polar, hydrophobic copolymers comprising monomers selected from styrene, maleic anhydride, modified polypropylene, or acrylic acid. The resultant lowered polarity of the thermoplastic molding composition gives increased resistance to hydrolysis. Another method proposed in the prior art for increasing the resistance of thermoplastic molding compositions to hydrolysis consists in adding crosslinkable additives and crosslinking these via irradiation.

A disadvantage is that no success has hitherto been achieved in increasing the thermal stability of thermoplastic molding compositions comprising glass fibers as reinforcement, and that no success has hitherto been achieved in increasing the resistance of glassfiber-reinforced thermoplastic molding compositions to hydrolysis without use of hydrophobic comonomers or copolymers.

It is therefore an object of the present invention to provide glassfiber-reinforced thermoplastic molding compositions which feature improved thermal stability and improved resistance to hydrolysis. This is in particular to be achieved without using hydrophobic comonomers or copolymers. Another object of the present invention is to provide components which are resistant to heat and to hydrolysis and are obtainable from the inventive thermoplastic molding compositions.

Accordingly, the molding compositions defined in the introduction have been found. Preferred embodiments are given in the subclaims.

The individual components of the inventive thermoplastic molding compositions are described below.

Component (A)

The inventive thermoplastic molding compositions comprise, as component (A), from 20 to 85% by weight, preferably from 40 to 75% by weight, of at least one polyamide.

The number of primary amino end groups in the polyamide is ≥50 mmol/kg, preferably ≥60 mmol/kg. The number of primary amino end groups in the polyamides that can be used according to the invention can be adjusted during their preparation via a suitable ratio of amino end groups to carboxylic acid end groups present in the monomers. The presence of this specific number of primary amino end groups contributes to an increase in the resistance to heat and/or to hydrolysis of the inventive thermoplastic molding compositions.

An example of a method for determining the amino end groups uses titration of a solution of the polyamide in the presence of an indicator. To this end, the polyamide is dissolved in a mixture composed of phenol and methanol (e.g. 75% by weight of phenol and 25% by weight of methanol), with gentle heating. For example, the mixture can be brought to boiling point under reflux until the polymer has dissolved. A suitable indicator or an indicator mixture (e.g. methanolic solution composed of benzyl orange and methylene blue) is admixed with the cooled solution, and the solution is titrated with a methanolic perchloric acid solution in glycol until color change occurs. The amino end group concentration is calculated from the consumption of perchloric acid.

As an alternative, the titration can also be conducted potentiometrically with a perchloric acid solution in ethylene glycol, without indicator, as described on page 11 of WO 92/26865.

The carboxy end groups can be determined, for example, likewise via titration of a solution of the polyamide, using an indicator. To this end, the polyamide is dissolved in benzyl alcohol (phenylmethanol) with gentle heating, e.g. until the solution boils, adding a vertical condenser and introducing gaseous nitrogen. A suitable indicator, e.g. a propanolic solution of cresol (red), is then admixed with the solution while it is still hot, and the solution is then immediately titrated with an alcoholic potassium hydroxide solution (KOH dissolved in a mixture composed of methanol, 1-propanol, and 1-hexanol) until color change occurs. The carboxy end group concentration is calculated from the consumption of KOH.

As an alternative, the titration can also be carried out conductometrically, without indicator, using a solution of NaOH in benzyl alcohol, as described on pages 11-12 of WO 02/26865.

In another preferred embodiment, the molar proportion of chains regulated by a diamine is ≥30 mol %, preferably ≥40 mol %, particularly preferably a ≥50 mol %, in the polyamide. The presence of at least 30 mol % of polymer chains regulated by a diamine attributes concomitantly to a significant increase in resistance to thermooxidative degradation and to hydrolysis. In one preferred embodiment, the diamine is added to the monomer mixture at the start of the polymerization reaction. In another preferred embodiment, the diamine is metered subsequently into the polymer melt during preparation of the polyamide.

In another preferred embodiment, the viscosity number of the polyamide is from 100 to 250 ml/g, preferably from 120 to 200 ml/g, particularly preferably from 140 to 170 ml/g. The viscosity number of the inventive polyamides likewise contributes to an increase in the resistance of the thermoplastic molding compositions to heat and/or to hydrolysis. The viscosity number VN is measured on a solution of concentration c=5 g/l to ISO 307 in 96% strength sulfuric acid.

Examples of suitable polyamides are described in U.S. Pat. Nos. 2,071,250, 2,071,251, 2,130,523, 2,130,948, 2,241,322, 2,312,966, 2,512,606 and 3,393,210.

Aliphatic, semiaromatic, or aromatic polyamides can be used, but aliphatic polyamides are preferred. The term "aliphatic polyamides" means that the polyamides have a structure exclusively composed of aliphatic monomers. The term "semiaromatic polyamides" means that the polyamides have a structure composed not only of aliphatic but also of aromatic monomers. The term "aromatic polyamides" means that the polyamides have a structure composed exclusively of aromatic monomers.

By way of example, suitable polyamides can be prepared via condensation of appropriate amounts of a saturated or of an aromatic dicarboxylic acid having from 4 to 12 carbon atoms with a saturated or aromatic diamine which has from 2 to 14 carbon atoms, or via condensation of aminocarboxylic acids or polyaddition of appropriate lactams having 3 to 12 carbon atoms.

It is also possible to use polyamides prepared via copolycondensation of two or more of the abovementioned monomers, e.g. copolymers composed of adipic acid, isophthalic acid, or terephthalic acid, and hexamethylenediamine, or copolymers composed of caprolactam, terephthalic acid, and hexamethylenediamine. Semiaromatic copolyamides of this type comprise from 40 to 90% by weight of units which derive from terephthalic acid and from hexamethylenediamine. A small proportion of the terephthalic acid, preferably not more than 10% by weight of the entire aromatic dicarboxylic acids used, can be replaced by isophthalic acid or by other aromatic dicarboxylic acids, preferably those in which the carboxy groups are in para-position.

Other monomers that can be used are cyclic diamines such as those of the general formula (I)

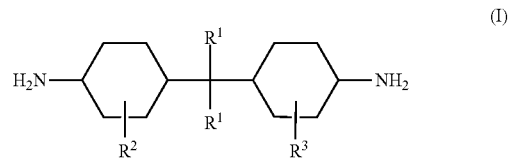

in which $R^1$ is hydrogen or a $C_1$-$C_4$-alkyl group, $R^2$ is a $C_1$-$C_4$-alkyl group or hydrogen, and $R^3$ is a $C_1$-$C_4$-alkyl group or hydrogen.

Particularly preferred diamines (I) are bis(4-aminocyclohexyl)methane, bis(4-amino-3-methylcyclohexyl)methane, bis(4-aminocyclohexyl)-2,2-propane, or bis(4-amino-3-methylcyclohexyl)2,2-propane. Other diamines (I) that may be mentioned are 1,3- or 1,4-cyclohexanediamine or isophoronediamine.

The semiaromatic copolyamides comprise, alongside the units which derive from terephthalic acid and from hexamethylenediamine, units which derive from ε-caprolactam, and/or units which derive from adipic acid and from hexamethylenediamine.

The proportion of units which derive from ε-caprolactam can be up to 50% by weight, preferably from 20 to 50% by weight, in particular from 25 to 40% by weight, while the proportion of units which derive from adipic acid and from hexamethylenediamine can be up to 60% by weight, preferably from 30 to 60% by weight, and in particular from 35 to 55% by weight.

The copolyamides can comprise not only units of ε-caprolactam but also units of adipic acid and of hexamethylenediamine, and in this case care has to be taken that the proportion of units free from aromatic groups is at least 10% by weight, preferably at least 20% by weight. The ratio of the units which derive from ε-caprolactam and from adipic acid and from hexamethylenediamine is not subject to any particular restriction here.

The semiaromatic copolyamides can by way of example be prepared by the processes described in EP-A-0 129 195 and EP-A-0 129 196.

The structure of further suitable copolyamides is in essence composed of from 30 to 44 mol %, preferably from 32 to 40 mol %, and in particular from 32 to 38 mol %, of units which derive from terephthalic acid, from 6 to 20 mol %, preferably from 10 to 18 mol %, and in particular from 12 to 18 mol %, of units which derive from isophthalic acid, from 43 to 49.5 mol %, preferably from 46 to 48.5 mol %, and in particular from 46.3 to 48.2 mol %, of units which derive from hexamethylenediamine, from 0.5 to 7 mol %, preferably from 1.5 to 4 mol %, and in particular from 1.8 to 3.7 mol %, of units which derive from aliphatic cyclic diamines having from 6 to 30, preferably from 13 to 29, and in particular from 13 to 17, carbon atoms, preferably of the above general formula (I), and from 0 to 4 mol % of further polyamide-forming monomers other than the abovementioned monomers, where the molar percentages of the components give a total of 100 mol %.

Further polyamide-forming monomers that can be used are aromatic dicarboxylic acids, such as substituted terephthalic and isophthalic acids, e.g. 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, diphenyl sulfone 4,4'- and 3,3'-dicarboxylic acid, 1,4- or 2,6-naphthalenedicarboxylic acid, and phenoxyterephthalic acid.

Further polyamide-forming monomers can, for example, derive from dicarboxylic acids having from 4 to 16 carbon atoms and from aliphatic diamines having from 4 to 16 carbon atoms, or else from aminocarboxylic acids or from appropriate lactams having from 7 to 12 carbon atoms. Just a few examples may be mentioned here of suitable monomers of these types: suberic acid, azelaic acid or sebacic acid as representatives of the aliphatic dicarboxylic acids, 1,4-butanediamine, 1,5-pentanediamine or piperazine as representatives of the diamines, and caprolactam, capryllactam, enantholactam, laurolactam, and $\alpha$-aminoundecanoic acid as representatives of lactams and aminocarboxylic acids.

For the purposes of the present invention, "derivable from" or "derived from" mean that the monomers themselves mentioned are used or monomers are used which come form the monomers mentioned via addition of identical or different, aliphatic or aromatic hydrocarbon radicals.

The melting points of these copolyamides are generally in the range from 290 to 340° C., preferably from 292 to 330° C., there being a connection between this melting point and a high glass transition temperature, generally >100° C., in particular >120° C., in each case in the dry state.

It is also possible, of course, to use a mixture of these copolyamides in any desired mixing ratio.

Suitable processes for preparation of the copolyamides are known to the person skilled in the art, see also EP-A-0 702 058.

It is preferable that at least one linear, aliphatic polyamide is used in the inventive thermoplastic molding compositions. In one preferred embodiment, the melting point of these polyamides is above 200° C.

Polyamides used in the thermoplastic molding compositions are particularly preferably those selected from the group consisting of polyhexamethyleneadipamide (nylon-6,6) a mixture of polyamides with nylon-6,6 content of at least 80% by weight or a copolyamide having at least 80% by weight of units derivable from adipic acid and from hexamethylenediamine, polyhexamethyleneazelamide (nylon-6,9), polyhexamethylenesebacamide (nylon-6,10), polyhexamethylenedodecanediamide (nylon-6,12), the polyamides obtained via ring opening of lactams, e.g. polycaprolactam (nylon-6), polylaurolactam, poly-11-aminoundecanoic acid, and a polyamide composed of di(p-aminocyclohexyl) methane and dodecanedioic acid, polyamides obtainable, for example, via condensation of 1,4-diaminobutane with adipic acid at an elevated temperature (nylon-4,6), and mixtures thereof. Preparation processes for polyamides of this structure are described by way of example in EP-A-0 038 094, EP-A-0 038 582 and EP-A-0 039 524.

Polycaprolactam (nylon-6) can also be obtained via a polycondensation reaction of 6-aminohexanoic acid.

Polyamides very particularly preferred in the inventive thermoplastic molding compositions are those selected from the group consisting of polyhexamethyleneadipamide (nylon-6,6) a mixture of polyamides with nylon-6,6 content of at least 80% by weight or a copolyamide having at least 80% by weight of units derivable from adipic acid and from hexamethylenediamine, polycaprolactam (nylon-6), and mixtures of these.

Component (B)

The inventive thermoplastic molding compositions comprise, as component (B), from 14.9 to 60% by weight, preferably from 20 to 49% by weight, of glass fibers.

Any of the glass fibers known to the person skilled in the art and suitable for use in thermoplastic molding compositions can be used in the inventive thermoplastic molding compositions. These glass fibers can be produced by processes known to the person skilled in the art and can, if appropriate, be surface-treated. To improve compatibility with the matrix material, the glass fibers can have been equipped with a size, for example one described in DE 10117715.

One preferred embodiment uses glass fibers whose diameter is from 5 to 15 µm, preferably from 7 to 13 µm, particularly preferably from 9 to 11 µm.

The glass fibers incorporated can take either the form of chopped glass fibers or else that of continuous-filament strands (rovings). The length of the glass fibers which can be used is generally and typically from 4 to 5 mm, prior to incorporation in the form of chopped glass fibers into the thermoplastic molding compositions. The average length of the glass fibers after their processing, for example via coextrusion, with the other components, is usually from 100 to 400 µm, preferably from 200 to 350 µm.

Component (C)

The inventive thermoplastic molding compositions comprise, as component C, from 0.01 to 2% by weight, preferably from 0.05 to 1.5% by weight, particularly preferably from 0.1 to 1.5% by weight, of at least one heat stabilizer.

In one preferred embodiment, the heat stabilizers have been selected from the group consisting of compounds of mono- or divalent copper, e.g. salts of mono- or divalent copper with inorganic or organic acids, or with mono- or dihydric phenols, the oxides of mono- or divalent copper, or the complexes of copper salts with ammonia, with amines, with amides, with lactams, with cyanides, or with phosphines, preferably cuprous or cupric salts of the hydrohalic acids, or of the hydrocyanic acids, or the copper salts of the aliphatic carboxylic acids. The monovalent copper compounds CuCl, CuBr, CuI, CuCN, and $Cu_2O$ are particularly preferred, as also are the divalent copper compounds $CuCl_2$, $CuSO_4$, CuO, cupric acetate or cupric stearate. If a copper compound is used, the amount of copper is preferably from 0.005 to 0.5% by weight, in particular from 0.005 to 0.3% by weight, and particularly preferably from 0.01 to 0.2% by weight, based on the entirety of components A) to E).

The copper compounds are commercially available, or their preparation is known to the person skilled in the art. The copper compound can be used as its stands or in the form of concentrates. A concentrate here is a polymer, preferably one whose chemical nature is identical with that of component (A), which comprises a high concentration of the copper salt. The use of concentrates is a conventional process and is particularly frequently applied when very small amounts of a starting material have to be metered. The copper compounds are advantageously used in combination with further metal halides, in particular alkali metal halides, e.g. NaI, KI, NaBr, KBr, where the molar ratio of metal halide to copper is from 0.5 to 20, preferably from 1 to 10, and particularly preferably from 2 to 5.

Stabilizers based on secondary aromatic amines, where the amount present of these stabilizers is preferably from 0.2 to 2% by weight, with preference from 0.5 to 1.5% by weight, Stabilizers based on sterically hindered phenols, where the amount present of these stabilizers is preferably from 0.05 to 1.5% by weight, with preference from 0.1 to 1% by weight, and mixtures of the abovementioned stabilizers.

Particularly preferred examples of stabilizers that can be used according to the invention and are based on secondary aromatic amines are adducts composed of phenylenediamine with acetone (Naugard A), adducts composed of phenylenediamine with linolene, Naugard 445 (II), N,N'-dinaphthyl-p-phenylenediamine (III), N-phenyl-N'-cyclohexyl-p-phenylenediamine (IV), or a mixture of two or more thereof

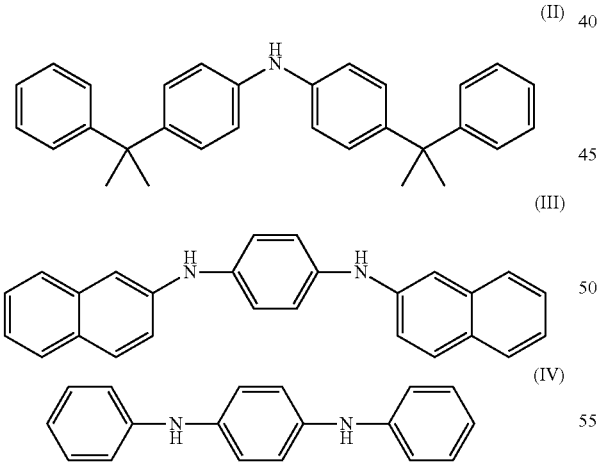

Preferred examples of stabilizers that can be used according to the invention and are based on sterically hindered phenols are N,N'-hexamethylene-bis-3-(3,5-di-tert-butyl-4-hydroxyphenyl)propionamide (V), bis(3,3-bis(4'-hydroxy-3'-tert-butylphenyl)butanoic glycol ester (VI), 2,1'-thioethyl bis(3-(3,5-di-tert-butyl-4-hydroxyphenyl)propionate (VII), 4-4'-butylidenebis(3-methyl-6-tert-butylphenol) (VIII), triethylene glycol 3-(3-tert-butyl-4-hydroxy-5-methylphenyl) propionate (IX) or a mixture of two or more thereof

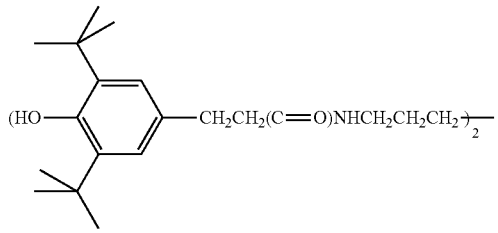

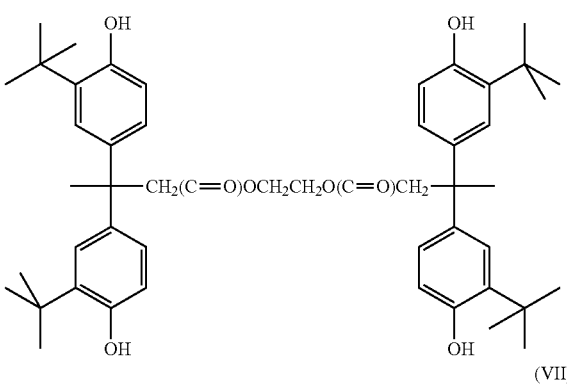

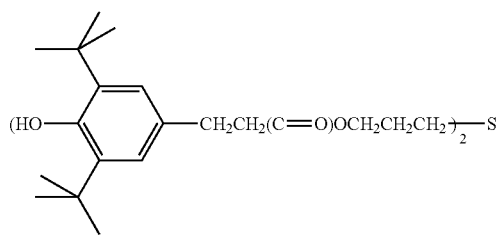

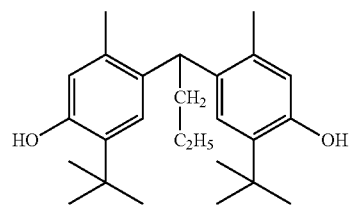

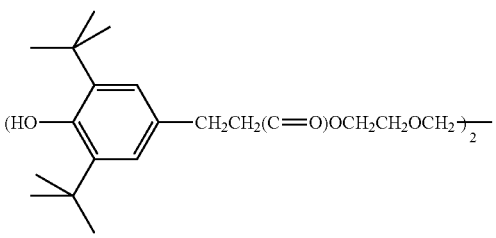

Component (D)

The inventive thermoplastic molding compositions comprise from 0 to 1.5% by weight, preferably from 0.05 to 1.5% by weight, particularly preferably from 0.1 to 1% by weight, of a mold-release agent.

Mold-release agents are added to the molding composition in order to ease demolding of the product produced, i.e. the release of the molding from the mold.

In one preferred embodiment, the mold-release agents have been selected from the group consisting of fatty acids and their alkali metal salts or their alkaline earth metal salts, or their zinc salts, and diamides composed of alkylenediamine and fatty acids. It is particularly preferable to use mold-release agents selected from the group consisting of calcium montanate, stearic acid, behenic acid, stearyl alcohol, alkyl stearates and stearamides, and esters of pentaerythritol with long-chain fatty acids, such as stearin, or Ca stearate, or Zn stearate.

Component (E)

The inventive thermoplastic molding compositions can comprise from 0 to 30% by weight, preferably from 0 to 20% by weight, of further additives.

Additives that can be used are any of the additives known to the person skilled in the art for use in thermoplastic molding compositions comprising polyamides or copolyamides. These have preferably been selected from the group consisting of pigments, mineral fillers, impact modifier, flame retardant, nucleating agent, sodium hypophosphite, and mixtures thereof.

The pigments for pigmenting thermoplastics are well known (see, for example, R. Gächter and H. Müller, Taschenbuch der Kunststoffadditive [Plastics additives handbook], Carl Hanser Verlag, 1983, pp. 494 to 510.

A first preferred group of pigments is that of white pigments, such as zinc oxide, white lead (2 $PbCO_3$ $Pb(OH)_2$), lithopones, antimony white and titanium dioxide. Of the two most commonly encountered crystalline forms (rutile and anatase) of titanium dioxide it is in particular the rutile form which is used for white coloration of the inventive molding compositions.

Black color pigments which can be used according to the invention are iron oxide black ($Fe_3O_4$), spinel black ($Cu(Cr, Fe)_2O_4$), manganese black (a mixture composed of manganese dioxide, silicon dioxide, and iron oxide), cobalt black, and antimony black, and also particularly preferably carbon black, mostly used in the form of furnace black or gas black.

According to the invention, it is also possible, of course, to achieve particular shades by using inorganic chromatic pigments, such as chromium oxide green, or organic chromatic pigments, such as azo pigments or phthalocyanines. Pigments of this type are widely available commercially.

It can also be advantageous to use the pigments or dyes mentioned in a mixture, e.g. carbon black with copper phthalocyanines, because the result is generally easier dispersion of the color in the thermoplastic.

Suitable particulate fillers are glass beads, glass flakes, amorphous silica, carbonates, such as calcium carbonate (chalk), powdered quartz, mica, a very wide variety of silicates, such as clays, muscovite, biotite, suzoite, tin maletite, talc, chlorite, phlogophite, feldspar, calcium silicates, such as wollastonite, or aluminum silicates, such as kaolin, particularly calcined kaolin.

Particularly preferred particulate fillers are talc, kaolin, such as calcined kaolin, or wollastonite, or a mixture composed of the above fillers.

Examples of impact modifiers are rubbers which can have functional groups. It is also possible to use a mixture composed of two or more different impact-modifying rubbers.

Rubbers which increase the toughness of the molding compositions generally comprise elastomeric content whose glass transition temperature is below −10° C., preferably below −30° C., and comprise at least one functional group capable of reaction with the polyamide. Examples of suitable functional groups are carboxylic acid, carboxylic anhydride, carboxylic ester, carboxamide, carboximide, amino, hydroxy, epoxy, urethane, or oxazoline groups, preferably carboxylic anhydride groups.

Among the preferred functionalized rubbers are functionalized polyolefin rubbers whose structure is composed of the following components:
1. from 40 to 99% by weight of at least one alpha-olefin having from 2 to 8 carbon atoms,
2. from 0 to 50% by weight of a diene,
3. from 0 to 45% by weight of a $C_1$-$C_{12}$-alkyl ester of acrylic acid or methacrylic acid, or a mixture of such esters,
4. from 0 to 40% by weight of an ethylenically unsaturated $C_2$-$C_{20}$ mono- or dicarboxylic acid or of a functional derivative of such an acid,
5. from 0 to 40% by weight of a monomer comprising epoxy groups, and
6. from 0 to 5% by weight of other monomers capable of free-radical polymerization, where the entirety of components 3) to 5) is at least from 1 to 45% by weight, based on components 1) to 6).

Examples that may be mentioned of suitable alpha-olefins are ethylene, propylene, 1-butylene, 1-pentylene, 1-hexylene, 1-heptylene, 1-octylene, 2-methylpropylene, 3-methyl-1-butylene, and 3-ethyl-1-butylene, preferably ethylene and propylene.

Examples that may be mentioned of suitable diene monomers are conjugated dienes having from 4 to 8 carbon atoms, such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene, and octa-1,4-diene, cyclic dienes, such as cyclopentadiene, cyclohexadienes, cyclooctadienes, and dicyclopentadiene, and also alkenylnorbornene, such as 5-ethylidene-2-norbornene, 5-butylidene-2-norbornene, 2-methallyl-5-norbornene, 2-isopropenyl-5-norbornene, and tricyclodienes, such as 3-methyltricyclo[5.2.1.0.2.6]-3,8-decadiene, or a mixture of these. Preference is given to hexa-1,5-diene, 5-ethylidenenorbornene, and dicyclopentadiene.

The diene content is preferably from 0.5 to 50% by weight, in particular from 2 to 20% by weight, and particularly preferably from 3 to 15% by weight, based on the total weight of the olefin polymer. Examples of suitable esters are methyl, ethyl, propyl, n-butyl, isobutyl, and 2-ethylhexyl, octyl, and decyl acrylates and the corresponding methacrylates. Among these, particular preference is given to methyl, ethyl, propyl, n-butyl, and 2-ethylhexyl acrylate and the corresponding methacrylate.

Instead of the esters, or in addition to these, acid-functional and/or latent acid-functional monomers of ethylenically unsaturated mono- or dicarboxylic acids can also be present in the olefin polymers.

Examples of ethylenically unsaturated mono- or dicarboxylic acids are acrylic acid, methacrylic acid, tertiary alkyl esters of these acids, in particular tert-butyl acrylate, and dicarboxylic acids, e.g. maleic acid and fumaric acid, or derivatives of these acids, or else their monoesters.

Latent acid-functional monomers are compounds which, under the polymerization conditions or during incorporation of the olefin polymers into the molding compositions, form free acid groups. Examples that may be mentioned of these are anhydrides of dicarboxylic acids having from 2 to 20 carbon atoms, in particular maleic anhydride and tertiary $C_1$-$C_{12}$-alkyl esters of the abovementioned acids, in particular tert-butyl acrylate and tert-butyl methacrylate.

Examples of other monomers that can be used are vinyl esters and vinyl ethers.

Particular preference is given to olefin polymers composed of from 50 to 98.9% by weight, in particular from 60 to 94.85% by weight, of ethylene and from 1 to 50% by weight, in particular from 5 to 40% by weight, of an ester of acrylic or methacrylic acid, from 0.1 to 20.0% by weight, and in particular from 0.15 to 15% by weight, of glycidyl acrylate and/or glycidyl methacrylate, acrylic acid, and/or maleic anhydride.

Particularly suitable functionalized rubbers are ethylene-methyl methacrylate-glycidyl methacrylate polymers, ethylene-methyl acrylate-glycidyl methacrylate polymers, ethylene-methyl acrylate-glycidyl acrylate polymers, and ethylene-methyl methacrylate-glycidyl acrylate polymers.

The polymers described above can be prepared by processes known per se, preferably via random copolymerization at high pressure and elevated temperature.

The melt index of these copolymers is generally in the range from 1 to 80 g/10 min (measured at 190° C. with a load of 2.16 kg).

Another group of suitable rubbers that may be mentioned is provided by core-shell graft rubbers. These are graft rubbers which are prepared in emulsion and which are composed of at least one hard constituent and of at least one soft constituent. A hard constituent is usually a polymer whose glass transition temperature is at least 25° C., and a soft constituent is usually a polymer whose glass transition temperature is at most 0° C. These products have a structure composed of a core and of at least one shell, and the structure here results via the sequence of addition of the monomers. The soft constituents generally derive from butadiene, isoprene, alkyl acrylates, alkyl methacrylates, or siloxanes, and, if appropriate, from further comonomers. Suitable siloxane cores can, for example, be prepared starting from cyclic oligomeric octamethyltetrasiloxane or tetravinyltetramethyltetrasiloxane. By way of example, these can be reacted with gamma-mercaptopropylmethyldimethoxysilane in a ring-opening cationic polymerization reaction, preferably in the presence of sulfonic acids, to give the soft siloxane cores. The siloxanes can also be crosslinked, for example by carrying out the polymerization reaction in the presence of silanes having hydrolyzable groups, such as halogen or alkoxy groups, e.g. tetraethoxysilane, methyltrimethoxysilane, or phenyltrimethoxysilane. Suitable comonomers that may be mentioned here are, for example, styrene, acrylonitrile, and crosslinking or graft-active monomers having more than one polymerizable double, bond, e.g. diallyl phthalate, divinylbenzene, butanediol diacrylate, or triallyl(iso)cyanurate. The hard constituents generally derive from styrene, and from alpha-methylstyrene, and from their copolymers, and preferred comonomers that may be listed here are acrylonitrile, methacrylonitrile, and methyl methacrylate.

Preferred core-shell graft rubbers comprise a soft core and a hard shell, or a hard core, a first soft shell, and at least one further hard shell. Functional groups, such as carbonyl, carboxylic acid, anhydride, amide, imide, carboxylic ester, amino, hydroxy, epoxy, oxazoline, urethane, urea, lactam, or halobenzyl groups, are preferably incorporated here via addition of suitably functionalized monomers during polymerization of the final shell. Examples of suitable functionalized monomers are maleic acid, maleic anhydride, mono- or diesters of maleic acid, tert-butyl (meth)acrylate, acrylic acid, glycidyl (meth)acrylate, and vinyloxazoline. The proportion of monomers having functional groups is generally from 0.1 to 25% by weight, preferably from 0.25 to 15% by weight, based on the total weight of the core-shell graft rubber. The ratio by weight of soft to hard constituents is generally from 1:9 to 9:1, preferably from 3:7 to 8:2.

Such rubbers are known per se and are described by way of example in EP-A-0 208 187. Oxazine groups for functionalization can be incorporated by way of example according to EP-A-0 791 606.

Another group of suitable impact modifiers is provided by thermoplastic polyester elastomers. Polyester elastomers here are segmented copolymers which comprise long-chain segments which generally derive from poly(alkylene) ether glycols and comprise short-chain segments which derive from low-molecular-weight diols and from dicarboxylic acids. Such products are known per se and are described in the literature, e.g. in U.S. Pat. No. 3,651,014. Appropriate products are also commercially available as Hytrel™ (DuPont), Arnitel™ (Akzo), and Pelprene™ (Toyobo Co. Ltd.).

Mixtures of various rubbers can, of course, also be used.

An example of a flame retardant is elemental phosphorus. The elemental phosphorus can generally be coated or phlegmatized with, for example, polyurethanes or amino plastics or dialkyl phthalates, e.g. dioctyl phthalate. Concentrates of red phosphorus, for example in a polyamide, in elastomers, or in polyolefins, are also suitable. Combinations of elemental phosphorus with 1,2,3,4,7,8,9,10,13,13,14,14-Dodecachloro-1,4,4a,5,6,6a,7,10,10a,11,12,12a-dodecahydro-1, 4,7,10-dimethanodibenzoe(a,e)-cyclooctan (Dechlorane®™ Plus, Occidental Chemical Corp.) and, if appropriate, with a synergist, such as antimony trioxide, are particularly preferred. Phosphorus compounds such as organic phosphates, phosphonates, phosphinates, phosphine oxides, phosphines, or phosphites are likewise preferred. Examples that may be mentioned are triphenylphosphine oxide and triphenylphosphate. This can be used alone or mixed with hexabromobenzene or with a chlorinated biphenyl and, optionally, antimony oxide.

The following are examples of suitable phosphates:

Phenyl bisdodocyl phosphate, phenyl bisneopentyl phosphate, phenyl ethyl hydrogenphosphate, phenyl bis(3-5,5'-trimethylhexyl) phosphate, ethyl diphenyl phosphate, 2-ethylhexyl di(p-tolyl) phosphate, bis(2-ethylhexyl) phenyl phosphate, tri(nonylphenyl) phosphate, phenyl methyl hydrogenphosphate, di(dodecyl) p-tolyl phosphate, tricresyl phosphate, triphenyl phosphate, dibutyl phenyl phosphate, diphenyl hydrogenphosphate, and melamine polyphosphate. The most preferred phosphate is triphenyl phosphate. Further preference is given to the combination of triphenyl phosphate with hexabromobenzene and antimony trioxide.

Other suitable flame retardants are compounds which comprise phosphorus-nitrogen bonds, e.g. phosphonitrile chloride, phosphoric ester amides, phosphoric ester amines, phosphoramides, phosphonamides, tris(aziridinyl)phosphine oxide, and tetrakis(hydroxymethyl)phosphonium chloride. Most of these flame-retardant additives are commercially available.

Further suitable flame retardants are hydroxides of magnesium which, if appropriate have been coated with silane compounds; or nitrogen compounds, such as melamine cyanurate.

Further halogen-containing flame retardants are tetrabromobenzene, hexachlorobenzene, and hexabromobenzene, and halogenated polystyrenes and polyphenylene ethers.

The halogenated phthalimides described in DE-A-19 46 924 can also be used. Among these, N,N'-ethylenebistetrabromophthalimide has achieved particular significance.

Nucleating agents that can be used are sodium phenylphosphinate, aluminum oxide, silicon dioxide, nylon-2,2, and also preferably talc.

The present invention also provides a process for preparation of the inventive molding compositions, where the appropriate amounts of components (A), (B), (C), and, if appropriate, (D) and (E) are mixed, preferably via extrusion. Commercially available twin-screw extruders of varying size (screw diameter) can be used in this process. The temperature during extrusion is from 200 to 400° C., preferably from 250 to 350° C., particularly preferably from 250 to 320° C.

The present invention also provides moldings obtainable from the inventive thermoplastic molding compositions.

These are preferably components for construction of heating systems, for outdoor applications, for lighting, for the electrical and electronics sector, or for the motor vehicle sector, e.g. motor vehicle radiators, engine covers, cladding for heating systems, covers for heating systems, lamp holders, inlet manifolds, cylinder-head covers, cooling-water tanks, valves, pump housings, pipelines, and charge-air coolers or charge-air cooler end caps.

The inventive thermoplastic molding compositions feature high resistance to heat and hydrolysis. They can be used to produce components which are used at locations or in situations where high resistance to heat and action of liquids is important. A feature of these components is that they are significantly less susceptible to damage resulting from heat and/or from hydrolysis, with resultant control of the risk of failure of the components. The inventive components can moreover also be used at relatively high temperatures at which the use of polymers has hitherto been impossible, necessitating the use of heavy metals or metal alloys, which are more expensive.

B) Chopped glass fiber for PA, diameter 10 μm
C) Heat stabilizer: CuI/KI mixture (molar ratio: 1/4)
D) Mold-release agent: calcium stearate Constitution of molding compositions:

|  | A1 [%] | A2 [%] | A3 [%] | A4 [%] | B [%] | C [%] | D [%] | VN [ml/g] |
|---|---|---|---|---|---|---|---|---|
| Comp 1 | 69.6 |  |  |  | 30 | 0.3 | 0.3 | 148 |
| Comp. 2 |  |  | 69.6 |  | 30 | 0.3 | 0.3 | 147 |
| Inv. Ex. 1 |  | 69.6 |  |  | 30 | 0.3 | 0.3 | 149 |
| Inv. Ex. 2 |  |  |  | 69.6 | 30 | 0.3 | 0.3 | 148 |

VN: c=5 g/l in 96% strength sulfuric acid, to ISO 307.
AEG and CEG were determined by titration (see pages 3/4)

The molar percentages of the diamine-regulated chains were:
For A1: 17%
For A2: 66%
For A3: 0% (no diamine present)
For A4: 63%
these being calculated as follows for A1 and A2, and also for A4:
For A1 and A2:
Molar percentage ($X_{AA}$) of diamine-regulated chains:

$$X_{AA} = \left(\frac{AEG}{AEG+CEG}\right)^2 \times 100\%$$

For A4:

$$X_{AA} = \frac{AEG-CEG}{AEG+CEG} \times 100\%$$

The molding compositions were prepared in an ZSK 40 with throughput of 30 kg/h (150 rpm) and with a flat temperature profile at about 280° C.

Mechanical properties prior to and after hydrolytic aging in G48/water (1/1) at 130° C. (Comp. 1, Inv. Ex. 1) or 120° C. (Comp. 2, Inv. Ex. 2) in an autoclave:

ISO 527 Tensile Test

|  | Modulus of elasticity [MPa] | | | | | Tensile stress at break [MPa] | | | | |
|---|---|---|---|---|---|---|---|---|---|---|
|  | 0 h | 250 h | 500 h | 750 h | 1000 h | 0 h | 250 h | 500 h | 750 h | 1000 h |
| Comp. 1 | 9900 | 4250 | 4700 | 4250 | 4240 | 193 | 78 | 78 | 37 | 35 |
| Comp. 2 | 9600 | 3700 | 3970 | 3950 | 3940 | 181 | 82 | 73 | 66 | 42 |
| Inv. Ex. 1 | 9800 | 4250 | 4750 | 4350 | 4320 | 196 | 81 | 85 | 47 | 43 |
| Inv. Ex. 2 | 9400 | 3680 | 3920 | 3910 | 3940 | 179 | 83 | 75 | 68 | 47 |

EXAMPLES

The following components were used:
A1) PA66: VN=149 ml/g, AEG=46 mmol/kg, CEG=65 mmol/kg (Adipic acid-regulated)
A2) PA66: VN=150 ml/g, AEG=84 mmol/kg, CEG=19 mmol/kg (HMD-regulated)
A3) PA6: VN=150 ml/g, AEG=36 mmol/kg, CEG=51 mmol/kg (Propionic acid-regulated)
A4) PA6: VN=150 ml/g, AEG=84 mmol/kg, CEG=19 mmol/kg (HMD-regulated)

|  | Tensile strain at break [%] | | | | |
|---|---|---|---|---|---|
|  | 0 h | 250 h | 500 h | 750 h | 1000 h |
| Comp. 1 | 3.3 | 3.7 | 2.8 | 1.1 | 1.0 |
| Comp. 2 | 3.5 | 6.1 | 4.8 | 3.1 | 1.5 |
| Inv. Ex. 1 | 3.2 | 3.8 | 3.2 | 1.6 | 1.3 |
| Inv. Ex. 2 | 3.6 | 6.5 | 5.1 | 3.4 | 1.8 |

ISO 179-2 Flexural Impact Test

| | Impact resistance [kJ/m²] | | | | |
|---|---|---|---|---|---|
| | 0 h | 250 h | 500 h | 750 h | 1000 h |
| Comp. 1 | 91 | 67 | 51 | 25 | 23 |
| Comp. 2 | 101 | 82 | 38 | 14 | 8 |
| Inv. Ex. 1 | 79 | 73 | 59 | 28 | 27 |
| Inv. Ex. 2 | 100 | 89 | 45 | 15 | 9 |

The invention claimed is:

1. A thermoplastic molding composition consisting of
(A) from 40 to 75% by weight of at least one linear, aliphatic polyamide wherein the number of primary amino end groups in the polyamide A) is ≥50 mmol/kg,
(B) from 14.9 to 60% by weight of glass fibers,
C) from 0.01 to 2% by weight of at least one heat stabilizer which has been selected from the group consisting of compounds of mono- and divalent copper, stabilizers based on secondary aromatic amines, stabilizers based on sterically hindered phenols, and mixtures of these,
(D) from 0 to 1.5% by weight of at least one mold-release agent, and
(E) from 0 to 30% by weight of other additives, and
at least one copper compound is added and the total amount of copper is from 0.01 to 0.2 percent by weight in respect to components (A)-(E) and
where the total of the percentages by weight of (A)-(E) is 100 based on the thermoplastic molding composition.

2. The molding composition according to claim 1, wherein the number of primary amino end groups in the polyamide A) is >60 mmol/kg.

3. The molding composition according to claim 1, wherein the molar proportion of chains regulated by a diamine is ≥30 mol % in the polyamide A).

4. The molding composition according to claim 1, wherein the viscosity number of the polyamide A) is from 100 to 250 ml/g.

5. The molding composition according to claim 1, wherein the diameter of the glass fibers is from 5 to 15 µm.

6. The molding composition according to claim 1, wherein the polyamide A) has been selected from the group consisting of polyhexamethyleneadipamide (nylon-6,6), a mixture of polyamides with nylon-6,6 content of at least 80% by weight or a copolyamide having at least 80% by weight of units derivable from adipic acid and from hexamethylenediamine, polycaprolactam (nylon-6), and mixtures of these.

7. A molding obtained from the thermoplastic molding compositions according to claim 1.

8. The molding composition according to claim 4, wherein the molar proportion of chains regulated by a diamine is ≥30 mol % in the polyamide A).

9. The molding composition according to claim 2, wherein the molar proportion of chains regulated by a diamine is ≥30 mol % in the polyamide A).

10. The molding composition according to claim 3, wherein the viscosity number of the polyamide A) is from 100 to 250 ml/g.

11. The molding composition according to claim 2, wherein the viscosity number of the polyamide A) is from 100 to 250 ml/g.

12. The molding composition according to claim 6, wherein the viscosity number of the polyamide A) is from 100 to 250 ml/g.

13. The molding composition according to claim 6, wherein the diameter of the glass fibers is from 5 to 15 µm.

14. The molding composition according to claim 2, wherein the diameter of the glass fibers is from 5 to 15 µm.

15. The molding composition according to claim 3, wherein the diameter of the glass fibers is from 5 to 15 µm.

16. The molding composition according to claim 4, wherein the diameter of the glass fibers is from 5 to 15 µm.

17. The molding composition according to claim 1, wherein the heat stabilizer C) is mono- or divalent copper that is used in combination with metal halides.

18. A thermoplastic molding composition consisting of
(A) from 40 to 75% by weight of at least one linear, aliphatic polyamide wherein the number of primary amino end groups in the polyamide A) is ≥50 mmol/kg,
(B) from 14.9 to 60% by weight of glass fibers,
(C) from 0.01 to 2% by weight of at least one heat stabilizer which has been selected from the group consisting of compounds of mono- and divalent copper, stabilizers based on secondary aromatic amines, stabilizers based on sterically hindered phenols, and mixtures of these,
(D) from 0 to 1.5% by weight of at least one mold-release agent, and
(E) from 0 to 30% by weight of other additives selected from the group consisting of pigments, mineral fillers, impact modifier, flame retardant, nucleating agent, sodium hypophosphite, and mixtures thereof, and
at least one copper compound is added and the total amount of copper is from 0.01 to 0.2 percent by weight in respect to components (A)-(E) and
where the total of the percentages by weight of (A)-(E) is 100 based on the thermoplastic molding composition.

19. A thermoplastic molding composition comprising
(A) from 40 to 75% by weight of at least one linear, aliphatic polyamide wherein the number of primary amino end groups in the polyamide A) is ≥60 mmol/kg,
(B) from 14.9 to 60% by weight of glass fibers,
(C) from 0.01 to 2% by weight of at least one heat stabilizer which has been selected from the group consisting of compounds of mono- and divalent copper, stabilizers based on secondary aromatic amines, stabilizers based on sterically hindered phenols, and mixtures of these,
(D) from 0 to 1.5% by weight of at least one mold-release agent, and
(E) from 0 to 30% by weight of other additives, and
at least one copper compound is added and the total amount of copper is from 0.01 to 0.2 percent by weight in respect to components (A)-(E) and
where the total of the percentages by weight of (A)-(E) is 100 based on the thermoplastic molding composition.

20. The molding composition according to claim 1, wherein component (E) the other additive is selected from the group consisting of pigments, mineral fillers, impact modifier, flame retardant, nucleating agent, sodium hypophosphite, and mixtures thereof.

* * * * *